(12) United States Patent
Nemirovski

(10) Patent No.: US 6,671,379 B2
(45) Date of Patent: *Dec. 30, 2003

(54) EAR MICROPHONE APPARATUS AND METHOD

(75) Inventor: Guerman G. Nemirovski, St. Petersburg, FL (US)

(73) Assignee: Think-A-Move, Ltd., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,291

(22) Filed: Jul. 31, 2001

(65) Prior Publication Data

US 2002/0141602 A1 Oct. 3, 2002

Related U.S. Application Data

(63) Continuation-in-part of application No. 09/897,696, filed on Jul. 2, 2001.
(60) Provisional application No. 60/280,282, filed on Mar. 30, 2001.

(51) Int. Cl.$^7$ .............................................. H04B 15/00
(52) U.S. Cl. ......................... 381/93; 381/318; 381/312
(58) Field of Search ....................... 381/93, 318, 312; 704/270

(56) References Cited

U.S. PATENT DOCUMENTS

| | | | |
|---|---|---|---|
| 3,870,034 A | 3/1975 | James | 128/2.1 |
| 4,064,870 A | 12/1977 | Dumitrescu et al. | 128/2 |
| 4,429,702 A | 2/1984 | von Recklinghausen | 128/742 |
| 4,533,795 A | 8/1985 | Baumhauer, Jr. et al. | 179/111 |
| 4,652,702 A | 3/1987 | Yoshii | 381/151 |
| 4,922,471 A | 5/1990 | Kuehnel | 367/181 |
| 4,930,156 A * | 5/1990 | Norris | 379/388 |
| 5,149,104 A | 9/1992 | Edelstein | 273/434 |
| 5,164,984 A * | 11/1992 | Suhami et al. | 379/444 |
| 5,280,524 A | 1/1994 | Norris | 379/387 |

(List continued on next page.)

FOREIGN PATENT DOCUMENTS

| | | |
|---|---|---|
| CH | 678695 A5 | 10/1991 |
| EP | 0 501 058 A2 | 9/1992 |
| EP | 0 767 417 A1 | 4/1997 |
| GB | 2234882 | 2/1991 |
| WO | WO 97/09927 | 3/1997 |
| WO | WO 00/03639 | 1/2000 |
| WO | WO 00/69215 | 11/2000 |
| WO | WO 01/39662 | 6/2001 |

OTHER PUBLICATIONS

*Detection of Sensorineural Hearing Impairment By Using DPOAE Technique and Classifiers*, A. Nevcihan, et al., 1995 IEEE–EMBC and CMBEC, Theme 4: Signal Processing, 0–7803–2475–7/97.

(List continued on next page.)

Primary Examiner—Forester W. Isen
Assistant Examiner—Elizabeth McChesney
(74) Attorney, Agent, or Firm—Renner, Otto, Boisselle & Sklar, LLP (57) ABSTRACT

An earset including a housing positionable with respect to an ear of a person, a microphone disposed with respect to the housing for insertion into the ear of a person, the microphone operable to detect a change in air pressure within the ear while the person speaks and to produce an electrical microphone signal corresponding to the internally detected change in air pressure and a speaker disposed with respect to the housing and operable to produce a sound corresponding to an electrical speaker signal. The earset also includes a circuit coupled to receive the microphone signal and the speaker signal and operable to produce a corrected microphone signal having a reduced feedback component of the microphone signal, the feedback component resulting from the detection by the microphone of the sound produced by the speaker to produce a corrected microphone signal.

17 Claims, 3 Drawing Sheets

U.S. PATENT DOCUMENTS

| | | | | |
|---|---|---|---|---|
| 5,363,444 | A | 11/1994 | Norris | 379/430 |
| 5,373,555 | A | 12/1994 | Norris et al. | 379/430 |
| 5,474,082 | A | 12/1995 | Junker | 600/545 |
| 5,638,826 | A | 6/1997 | Wolpaw et al. | 128/732 |
| 5,659,156 | A | 8/1997 | Mauney et al. | 181/130 |
| 5,676,138 | A | 10/1997 | Zawilinski | 128/630 |
| 5,692,517 | A | 12/1997 | Junker | 600/545 |
| 5,734,713 | A | 3/1998 | Mauney et al. | 379/395 |
| 5,740,258 | A | 4/1998 | Goodwin-Johansson | 381/72 |
| 5,812,659 | A | 9/1998 | Mauney et al. | 379/430 |
| 5,812,978 | A | 9/1998 | Nolan | 704/275 |
| 5,878,396 | A | 3/1999 | Henton | 704/276 |
| 5,881,159 | A | 3/1999 | Aceti et al. | 381/328 |
| 5,896,451 | A | 4/1999 | Deas | 379/387 |
| 6,022,311 | A | 2/2000 | Juneau et al. | 600/25 |
| 6,024,700 | A | 2/2000 | Nemirovski et al. | 600/300 |
| 6,072,884 | A * | 6/2000 | Kates | 381/318 |
| 6,156,585 | A | 12/2000 | Gogoi et al. | 438/48 |
| 6,175,633 | B1 | 1/2001 | Morrill et al. | 381/71.6 |
| 6,283,915 | B1 | 9/2001 | Aceti et al. | 600/300 |
| 2002/0143242 | A1 * | 10/2002 | Nemirovski | 600/300 |

OTHER PUBLICATIONS

Sound Radio Products™ Better Living Through Wireless Technology, printed Oct. 29, 2001 from Internet Website http://www.soundradio.com/en–921.html.

*Archives of Physical Medicine and Rehabilitation*, "Answering Questions With an Electroencephalogram–Based Brain–Computer Interface," by Laurie A. Miner, MS, PT, et al.; taken from the Internet at http://www.archives–pmr.prg/abs79_9/v9n9p029.html and http://silk.nig.gov/silk/ncmrr/abstract/absJRW1.htm, 3 pages.

*Devices Read Brain Waves*, "They help paralyzed communicate," by Robert S. Boyd, taken from the Internet at http://www.freep.com/tech/qthink25.htm, 4 pages.

"Discover the Cyberlink™ Mind Mouse!," Reprinted from the Internet at http://www.mindmouse.com, Dec. 4, 1998, 1 page.

"The Cyberlink™ Mind Mounse," Reprinted from the Internet at http://www.mindmouse.com/Business/bat.hem, Dec. 4, 1998, 2 pages.

The Other 90%, "The MindDrive Thought Response Technology," taken from the Internet at http://www.other90.com/new/htm/whitepage.htm, Jul. 9, 1998, 2 pages.

"Brain Actuated Technologies," Reprinted from the Internet at http://www.mindmouse.com/Business/Bat.htm, Dec. 4, 1998, 2 pages.

International Search Report for corresponding International Patent Application No. PCT/US02/10176.

Claims from Ser. No. 09/897,696; filed Jul. 2, 2001.

Claims from Ser. No. 09/706,091; filed Nov. 3, 2000, and as amended May 7, 2002.

* cited by examiner

EAR MICROPHONE APPARATUS AND METHOD

RELATED APPLICATION(S)

This application is a continuation-in-part of U.S. application Ser. No. 09/897,696, filed Jul. 2, 2001, the entire disclosure of which is incorporated herein by reference, and this application claims the benefit of U.S. Provisional Application No. 60/280,282, filed Mar. 30, 2001, the entire disclosure of which is incorporated herein by reference.

FIELD OF THE INVENTION

The present invention generally relates to a sensor placed with respect to an ear. More particularly, the sensor is used to detect speech and other oral vocalizations of a person with a microphone as well as deliver sound to the ear of the person with a speaker. Feedback from the speaker to the microphone is reduced.

BACKGROUND OF THE INVENTION

Wireless mobile telephones, also referred to as a cellular telephones, have become exceedingly popular communication devices. However, the vast majority of cellular telephones contain a transceiver (e.g., a radio frequency, or RF, transceiver) for establishing a communication link with a remote location, such as a cell phone tower. In order to carry out a conversation with another person using the wireless telephone, the user must hold the telephone adjacent the ear and mouth of the user. This presents the disadvantage of occupying the use of at least one of the user's hands. In many situations, hands free use of the wireless telephone is desirable. The same is true for receivers, or handsets, found in hard-wired telephone systems. For example, the user of a hard-wired telephone system may wish to type on a computer while speaking on the phone. In addition, medical professionals and others have expressed concerns relating to the health of wireless telephone users who engage in prolonged use of an RF transceiver adjacent their head.

There are many commercially available headsets available to users of wireless and/or hard-wired telephone systems. These headsets are intended to assist the user in carrying out a conversation without the use of the user's hands and to locate the telephone (and any RF transceiver) away from the user's head. These headsets typically include an ear piece containing a speaker. The ear piece can be removably placed with respect to the user's ear and broadcasts sounds to the user's ear. The headsets also typically include a microphone disposed on a support member that positions the microphone with respect to the users mouth. The microphone is used to detect speech and other vocalizations emanating from the mouth of the user. The detected sounds are converted into an electrical signal and transmitted by the telephone to a backbone telecommunications network and on to the telephone of another person. In this manner the user can carry out a fully duplexed conversation with the other person.

However, the headsets can be cumbersome to use. More particularly, care must be taken to ensure that the microphone is properly positioned and that the microphone maintains that position. The need to adjust the headset during a conversation can be distracting to the user. In addition, improper positioning of the microphone may lead to poor and/or unreliable detection of the user's speech. This problem is compounded by the common occurrence of the microphone detecting environmental noise, such as the sound of a passing vehicle, conversations taking place near the user and the like. The detected environmental noise is ultimately transmitted by the telephone.

Accordingly, there exists a need in the art for an easy to use telephone headset that accurately detects the user's speech, even when speaking at a low volume, and reduces the detection of environmental noise.

SUMMARY OF THE INVENTION

According to one aspect of the invention, an earset including a housing positionable with respect to an ear of a person; a microphone disposed with respect to the housing for insertion into the ear of a person, the microphone operable to detect a change in air pressure within the ear while the person speaks and to produce an electrical microphone signal corresponding to the internally detected change in air pressure; a speaker disposed with respect to the housing and operable to produce a sound corresponding to an electrical speaker signal; and a circuit coupled to receive the microphone signal and the speaker signal and operable to produce a corrected microphone signal having a reduced feedback component of the microphone signal, the feedback component resulting from the detection by the microphone of the sound produced by the speaker to produce a corrected microphone signal.

According to another aspect of the invention, a method of detecting speech of a person including the steps of placing a microphone at least partially within an ear of the person; detecting a change in air pressure within the ear of the person using the microphone, the change in air pressure corresponding to the speech of the person; producing an electrical microphone signal corresponding to the internally detected change in air pressure; placing a speaker with respect to the ear of the person; generating a sound with the speaker corresponding to an electrical speaker signal; and generating a corrected microphone signal by reducing a feedback component of the microphone signal, the feedback component resulting from the detection by the microphone of the sound generated by the speaker to produce a corrected microphone signal.

According to yet another aspect of the invention, a method of enhancing a signal representing a detected first sound pattern, including directly coupling the signal representing the detected first sound pattern with a signal for producing a second sound pattern.

BRIEF DESCRIPTION OF THE DRAWINGS

These and further features of the present invention will be apparent with reference to the following description and drawings, wherein.

DETAILED DESCRIPTION OF THE INVENTION

The following is a detailed description of the present invention made in conjunction with the attached figures, wherein like reference numerals will refer to like elements throughout. To illustrate the present invention in a clear and concise manner, the drawings may not necessarily be to scale and certain features may be shown in somewhat schematic form.

The present invention is directed to a communication system, including a communications device and an ear microphone, or earset, assembly. The communications system allows a user to speak with a remotely located person. The ear microphone assembly, also referred to herein as an earset, includes a microphone and a speaker supported by a housing. The housing is retained by the ear of the user and allows for hands free use of the communication system while carrying on a conversation with the remotely located person. The microphone is directed towards the ear canal of the user and detects sounds emanating or coming out of the ear (or air pressure changes occurring within the ear) to accurately and reliably detect the speech of the user. The position of the microphone may also help to reduce detection of externally generated sounds. The ear microphone assembly allows for separation of a speech input device for a cellular, or wireless, telephone from an RF transceiver of the telephone.

Additionally, the earset assembly of the present invention allows a user to speak more quietly (e.g., such as at a whisper or near whisper) than with conventional headsets. This allows for more private conversations and less disruption to others. There is also a body of evidence indicating that the softer one speaks, the less concentration is needed to maintain the conversation, thereby allowing the individual at least to partially engage in other activities while speaking.

The earset of the present invention does not rely on directionality of the microphone or a detection of sound that has emanated from the user's mouth. Therefore, the need to repeatedly adjust the position of the earset that would otherwise distract the user and require the use of the user's hands. Also, the size and arrangement of the earset is small, resulting in a more cosmetically appealing device. Such a device can be used unobtrusively. For example, the device would not be noticed as much by others when used in public, or by a person being observed by others, such as, for example, a television news anchor or a secret service agent.

It is noted that the term air pressure changes is used in its broadest sense and includes, for example, sound waves (whether audible to the user or not), pressure fluctuations, vibrations, resonations and the like. In addition, the term air pressure changes as used herein includes vibrations conducted by the bones and tissue of the user that are carried to ear. These conducted vibrations can vibrate the housing leading to sound detection by the microphone. The conducted vibrations may also cause anatomical parts of the ear to resonate, and/or amplify sounds, thereby leading to sound detection by the microphone. The air pressure changes may be caused by one or more factors, including vibrations of the ear drum, vibrations of bone within the ear, vibrations of other anatomical structures within the ear and vibrations conducted by the bones and/or tissue of the user to the ear and which invoke an air pressure change in the ear.

As a result, the sensor can be used to detect a person's speech. It is also noted that the term speech is used in its broadest sense and includes spoken words and utterances, as well as other vocalizations produced by the user, including, for example, grunts, whistles, singing, coughs, "clicking" sounds made by movement of the lips or tongue, and the like. To facilitate the description herein, the event of sensing or detecting by the microphone will be referred to as detecting and that which is detected will be referred to as a change within the ear, or simply an air pressure change. The present invention monitors changes within the human ear which occur instantaneously, or nearly instantaneously, in response to the speech of the person to provide a substantially real-time speech detection system.

Figure 1:
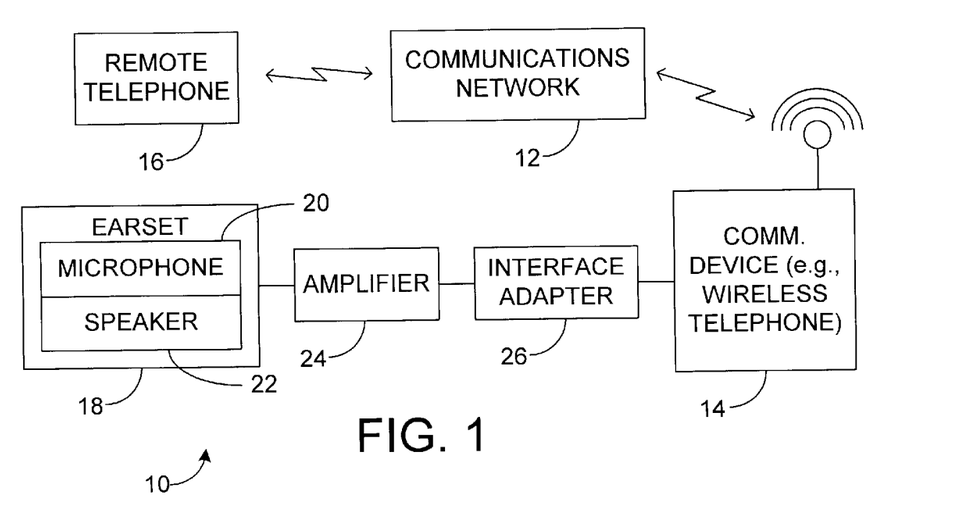
FIG. 1 is a block diagram illustrating a communications system according to the present invention.

Turning now to the figures, FIG. 1 is a block diagram which illustrates a communications system 10 for establishing duplexed (two-way) audio communication between two or more individuals. The communications system 10 includes a communications network 12, or backbone network. The communications network 12 establishes communication links with at least one communication device 14, thereby enabling a user of the communication device 14 to carry on a conversation with a remotely located person using a remotely located telephone 16 as is known in the art. In the illustrated embodiment, the communication device 14 and the remote telephone 16 are wireless telephones, such as cellular telephones. However, one skilled in the art will appreciate that the communication device 14 and/or the remote telephone 16 can be other types of devices, including hardwired (land line) telephones, radios, personal digital assistants (PDAs), portable or stationary computers, etc. The communications network 12 can also be alternative type of network, such as the Internet, a WAN, or a LAN.

Figure 3:
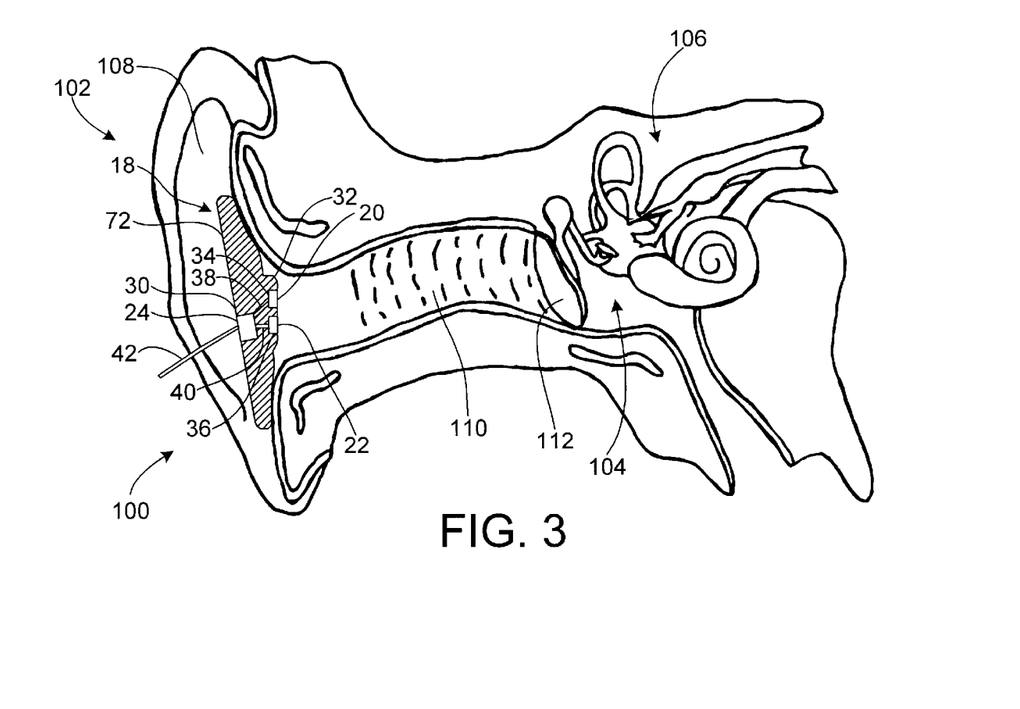
FIG. 3 is a cross-sectional view of an ear microphone assembly, or earset, disposed with respect to the ear of a person, and the ear also shown in cross-section.

The communications system 10 includes an ear microphone assembly, or earset 18, having a microphone 20 and a speaker 22 supported by a housing 30 (FIG. 3). The physical arrangement of the earset 18 will be described in more detail below. The microphone 20 is used to detect sounds emanating or coming from the ear (sometimes referred to as air pressure changes within the ear) of the user that result from speech of the user. The microphone 20 converts those detections into an electrical signal. The electrical signal is optionally amplified by an amplifier 24. Next, the amplified electrical signal is received by the communication device 14 via an appropriate interface adapter 26. The interface adapter 26 can be, for example, a jack or other electrical connector received by a corresponding receptacle of the communication device 14.

The speaker 22 is used to transmit (i.e., broadcast) sounds to the user. These sounds include sounds generated in response to signals received by the communication device 14 over the communications network 12. In this way, the earset 18 and communication device 14 can be used as a bi-directional communication apparatus.

In one embodiment, the earset 18 is coupled to the communication device using three conductors. A first of the conductors is used as a common ground. A second of the conductors carries electrical signals to the speaker 22 to be converted into sound waves. The third of the conductors carries electrical signals representing detected sounds from the microphone 20 to the communication device 14 for transmission to the communications network 12. The third conductor also carries power for the microphone 20 and amplifier 24. In this embodiment, the interface adapter 26 cen be implemented with a 2.5 mm jack as is known in the art.

Figure 2:
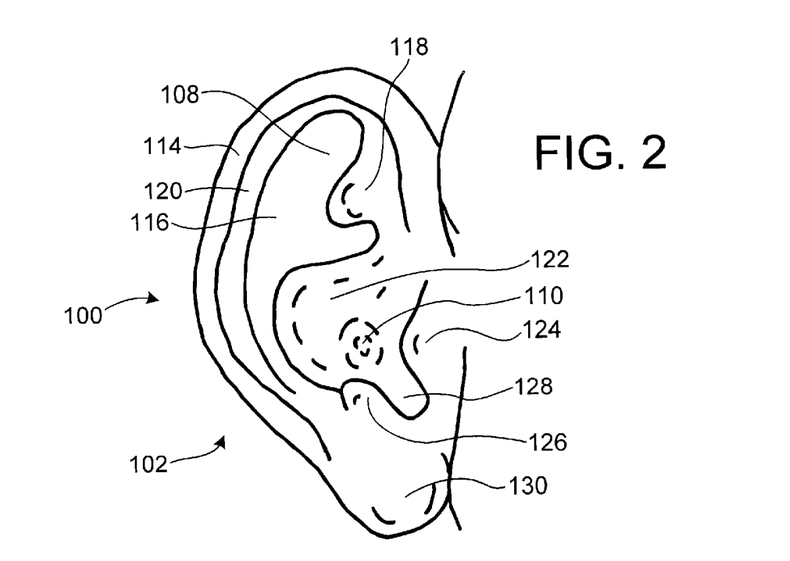
FIG. 2 is a schematic view of an ear.

Referring to FIGS. 2 and 3, an external view and a cross-sectional view of an ear 100 are respectively illustrated. FIG. 3 also shows the earset 18 in cross-section. According to Henry Gray's famous text "Anatomy", the human ear is divided into three parts, including the external ear 102, the middle ear (or tympanum) 104 and the internal ear (or labyrinth) 106. The middle ear 104 and the internal ear 106 will not be described in great detail herein. The external ear 102 includes an expanded portion, or a pinna 108 (also referred to as an auricle), and an ear canal 110 (also referred to as a meatus or auditory canal). The pinna 108 serves to collect vibrations of the air surrounding the person's head. The ear canal 110 conducts those vibrations to the tympanum, or ear drum 112.

The pinna 108 has a generally ovoid form with a larger end directed upward and having an outer surface that is irregularly concave and directed slightly forward. The pinna 108 has a number of eminences and depressions. Typically, the ear 100 has a prominent and curved rim, or helix 114. Generally parallel to the helix 114 is another curved prominence, or antihelix 116. The antihelix 116 bifurcates to form a triangular depression, or a fossa of the antihelix 118 (also referred to as a fossa triangularis). A narrow, curved depression located between the helix 114 and antihelix 116 is referred to as fossa of the helix, or scapha 120. The antihelix 116 also curves around a deep, capacious cavity, or the concha 122 (the concha 122 being divided by the commencement of the helix 114, or crus helicis, into an upper part, termed the cymba conchae, and a lower part, termed the cavum conchae). The concha 122 leads inward to an opening of the ear canal 110. In front of the concha 122 and projecting backward (usually over the opening of the ear canal 110) is a pointed eminence, or tragus 124. Opposite the tragus 124 is a tubercle, or antitragus 126. A notch-like depression, or incisura intertragica 128, is disposed between the tragus 124 and antitragus 126. A lobule 130 is present under the tragus 124 and antitragus 126.

The ear canal 110 is an oval cylindrical passage extending from a bottom of the concha 122 to the ear drum 112. The ear canal 110 is about an inch and a half in length when measured from the tragus 124 to the ear drum 112. When measured from the bottom of the concha 122 to the ear drum 112, the ear canal is about an inch long. The ear canal 110 forms a gradual "S-shaped" curve and is directed, at first, inward, forward and slightly upward (i.e., pars externa). The ear canal 110 then passes inward and backward (i.e., pars media) and then passes inward, forward and slightly downward (i.e., pars interna).

It is not certain what physical, chemical or neural mechanism causes or generates the changes in air pressure in or near the ear or sounds to some from the ear in response to various actions of the user. However, due to the connection of the oral cavity to the ear via the eustachian tube, speech and movements of the mouth may cause an air pressure, a change in air pressure or an air flow to or from the ear leading to a detectable air pressure which can be detected by the microphone 20. Regardless of the exact physical, chemical or neural mechanism, empirical testing has confirmed that the user's speech generates pressure changes in or near the ear of the person. Consequently, the air pressure changes can be monitored near the ear and used to detect the speech of a user.

The present invention uses various forms of the terms "changes in air pressure", "changes within the ear" and "sounds emanating or coming from the ear" in their broadest sense to characterize the parameter being measured. Changes in air pressure may alternatively be characterized as sound waves. These sound waves (or vibrations) may propagate through mediums other than air, such as bone and tissue. As is well known by those skilled in the art, as a sound wave spreads out from its source its intensity falls off (the energy per unit area decreases with the inverse square of the distance), but the total energy is constant. Consequently, it is desirable to have the microphone 20 sufficiently close to the source of the sound wave so that the intensity level of the detected changes will be as large as possible.

FIG. 3 illustrates the earset 18 inserted at least partially into the ear 100 of a person (i.e., at least within the cavity defined by the pinna 108, if not deeper within the ear 100 such as within the concha 122, at the opening of the ear canal 110 or slightly into the ear canal 110).

The earset 18 includes a housing 30, the microphone 20, the speaker 22 and the amplifier 24 (optionally the amplifier 24 can be located remotely from the earset 18 or as part of the communication device 14). The housing 30 can take on a number of different configurations. The housing 30 can resemble the housing design of a hearing aid, and particularly a digital hearing aid, for similar insertion, or partial insertion, into the ear 100 and/or ear canal 1 10. Alternatively, the housing 30 can resemble a miniature ear phone as found in conventional wireless telephone headsets or as used with personal audio/music players. The earset 30 can be retained by insertion into the ear 100, by a member disposed over or hanging from the ear and/or by a headset assembly.

The illustrated housing 30 is made from any suitable material, such as plastic, rubber or a gel-like material. Optionally, the housing 30, or portions thereof, can be made of pliable material, sound absorbing (or sound proofing) material and/or include sound insulating material such as foam.

The housing 30 is wider than an opening of the ear canal 110 and engages the pinna 108. In one embodiment, the housing 30 fits within the concha 122 and is retained, at least in part, by the tragus 124 and/or the antitragus 126. Such arrangement at least partially insulates the microphone 20 from externally generated noise and air pressure changes.

The microphone 20 is disposed on an interior portion 32 of the housing 30. Accordingly, the interior portion 32 is sized and shaped to position the microphone 20 with respect to the ear 100 and/or ear canal 110 as desired. In one embodiment, the interior portion 32 positions the microphone 20 and/or the speaker 22 in the concha 122. In another embodiment, the interior portion 32 positions the microphone 20 and/or the speaker 22 at the opening of the ear canal 110 where the ear canal 110 meets the concha 122. It should be appreciated that the interior portion 32, microphone 20 and/or the speaker 22 need not enter the ear canal 110. In yet another embodiment, the interior portion 32 extends into the ear canal 110 and positions the microphone 20 and/or the speaker 22 within the ear canal 110.

The housing 30 can be custom designed for the individual to form a close and comfortable fit with the ear of the individual. Alternatively, the housing can have a standard, or "stock", design for all individuals which is fabricated in a number of sizes. As one skilled in the art will appreciate, many alternative configurations for the housing 30 are possible and each are considered to fall within the scope of the present invention.

The interior portion 32 of the housing 30 has a recess 34 in which the microphone 20 is placed. Preferably, the air adjacent the ear drum 112 and/or the air in the ear canal 110 will be in fluid communication with the air adjacent the microphone 20. In this way, sounds or air pressure changes generated within the ear 100 will be transmitted directly to the microphone 20 through an air medium. Other sounds conducted by the bones and tissue of the user may be transmitted to the microphone 20 mechanically via the housing 30. In one embodiment, the microphone 20 is held in place with an adhesive. The microphone 20 in one embodiment is less than two mm in size. In an alternative embodiment, the microphone 20 is disposed within a hollow cavity defined by the housing 30 and an opening in a wall of the housing 30 defining the cavity is provided to establish fluid communication of the air inside the cavity and the air inside the ear canal 110.

By inserting the microphone 20 in the ear 100 and/or ear canal 110, the microphone 20 is a least partially shielded from environmental noise. More specifically, the housing 30 and the head of the user at least partially blocks externally generated sound waves before reaching the microphone 20.

In the illustrated embodiment, the microphone 20 is an omnidirectional microphone.

It should be appreciated that the microphone 20 can be moved closer to or further away from various anatomical structures within the ear 100 as desired for factors such as comfort and to optimize detection of the user's speech. It is noted that the microphone 20 is capable of detecting speech of the user speaking at a variety of volumes.

The microphone 20 can take on a number of different forms, such as a silicon or semiconductor microphone (also referred to as a pressure sensor) such as the devices disclosed in U.S. Pat. Nos. 4,533,795, 4,922,471, and 6,156,585, each of which are incorporated herein by reference in their entireties. It is noted that the foregoing devices are exemplary and other electroacoustic transducers from a number of different vendors can be used.

It has been shown that the use of one earset 18 with the microphone 20 in one of the ears 100 of an individual can be used to detect speech such that the resulting transmission by the communication device 14 allows the remotely located person using the remote telephone 16 to hear the speech of the user. However, empirical testing has shown that by using two such earsets, one in each of the ears of an individual, the performance of system 10 is improved due to the detection of more information. It is noted that in certain circumstances, the use of an earset 18 in both ears is discouraged (such as when using a cellular telephone while driving a car). It is noted that the circuitry, processing and logic routines described herein can be modified to process signals from a second earset 18. Such modifications will be apparent to one of ordinary skill in the art.

The interior portion 32 of the housing 30 has a second recess 36 in which the speaker 22 is placed. Preferably, the speaker 22 broadcasts sounds corresponding to the speech of the remotely located person using the remote telephone 16 and received by the communication device 14. The sounds are a reproduction of the remotely located person's speech and are made audible to the user by the speaker 22.

The microphone 20 is electrically coupled to the amplifier 24 with a conductor 38. The speaker 22 is also electrically coupled to the amplifier 24 with a conductor 40. The amplifier 24 is electrically coupled to the interface adapter 26 (FIG. 1) with a conductor 42. More specifically, the conductor 42 carries the amplified signals from the microphone 20 to the interface adapter 26 and carries signals to be converted into sound from the interface adapter 26 to the speaker. As one skilled in the art will appreciate, the amplifier 24 can be omitted or by-passed and the microphone 20 and/or speaker 22 can be coupled directly to the interface adapter 26 by way of a conductor or conductors.

Figure 4:
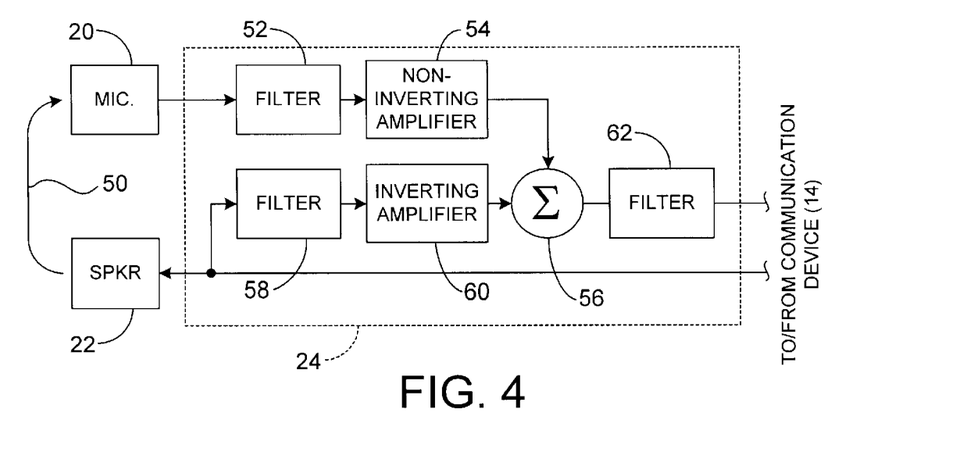
FIG. 4 is a block diagram of the ear microphone assembly.

A block diagram of the ear microphone assembly, and particularly the amplifier 24, is illustrated in FIG. 4. Since the microphone 20 is placed in close proximity to the speaker 22, the microphone 20 will tend to detect sounds generated by the speaker 22. These detections are in addition to detections of the user's speech. The sounds that have been generated by the speaker 22 and detected by the microphone 20 will be referred to herein as feedback and is represented in FIG. 4 by arrow 50. In one embodiment, the sensitivity of the earset 18 is tuned to minimize detection of sounds from the speaker 22 and/or to minimize the delivery of a feedback component to the communication device 14. For example, a potentiometer can be used to adjust the gain of the amplifier 24 as desired. Physical separation of the speaker 22 and the microphone 20 to reduce the detection of feedback is also possible.

In the illustrated embodiment, the amplifier 24 is configured to cancel at least some, if not all, of the feedback component of the electrical signal generated by the microphone 20. In this embodiment, the speaker 22 and the microphone 20 are placed in close physical proximity so that the feedback detected by the microphone 20 closely resembles the sound produced by the speaker 22. FIG. 4 illustrates an exemplary amplifier circuit 24 for canceling at least a portion of the feedback component. As one skilled in the art will appreciate, a variety of alternative analog or digital circuits can be used, each falling within the scope of the present invention.

The illustrated amplifier circuit 24 receives a electrical signal output from the microphone 22, referred to herein a microphone signal. The microphone signal is filtered by a filter 52. The filter 52 can be, for example, a filter to remove low frequency components of the microphone signal (e.g., frequencies below about 400 Hz). The filtered microphone signal is then amplified by a amplifier 54, such as a low power, non-inverting operational amplifier. The gain of the amplifier 54 is selected to condition the microphone signal to a voltage level meeting the input requirements of the communication device 14.

As indicated, the speaker 22 is coupled to the communication device 14 to receive an electrical signal for conversion into sound to be broadcast to the user of the earset 18. This signal will be referred to herein as a speaker signal. The speaker signal is also filtered by a filter 58. The filter 58 can be, for example, a filter to remove low frequency components of the speaker signal (e.g., frequencies below about 400 Hz). The filtered speaker signal is then amplified by an amplifier 60. The amplifier 60 can be, for example, a low power, inverting operational amplifier. The gain of the amplifier 60 is selected to condition the speaker signal to have an amplitude equal to, or approximately equal to, the amplified feedback component of the microphone signal.

The amplified microphone signal and the amplified speaker signal are then combined so as to cancel the feedback component of the microphone signal and generate a corrected microphone signal. It is noted that the polarity or phase of the amplified microphone signal and/or the amplified speaker signal may be adjusted to correctly combine the signals. The combination of the signals can be carried out by an adder 56. As one skilled in the art will appreciate, in an analog system, the signals can be combined by simply wiring the signals together. In one example, the conductors carrying the signals are directly connected together. Alternatively, analog or digital circuitry or processing can be used to carry out the combining function of the adder 56.

It is noted that the speaker signal can be delayed by a delay element if needed to compensate for any propagation delay of the feedback 50. An output of the adder 56 is coupled to a filter 62 for further conditioning of the corrected microphone signal, such as removing high frequency components of the corrected microphone signal (e.g. frequencies above about 4 KHz for the communication system described herein).

Many alternatives to the illustrated amplifier circuit 24 are contemplated and each are considered to fall within the scope of the present invention.

As another example, the high and low frequency filters can be replaced by a band pass filter. In another example modification, the speaker signal can be amplified and/or filtered before being applied to the speaker.

In yet another example modification, the analog microphone and speaker signals can be converted to digital signals and processed using digital signal processing techniques to derive a microphone signal with no, or very little, feedback component.

Processing of the microphone signal by the communication device 14 for transmission is well known in the art and will not be described in greater detail.

Figure 5:
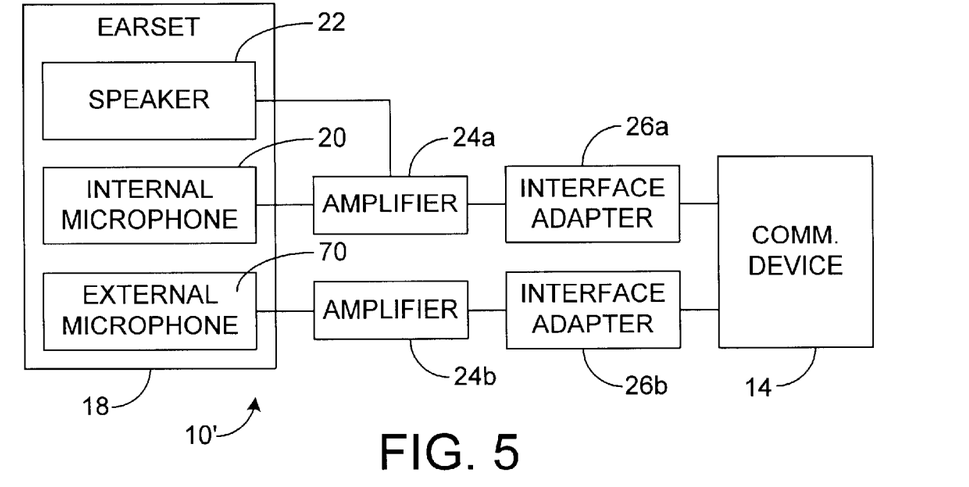
FIG. 5 is a block diagram of an ear microphone assembly according to another aspect of the invention.

With additional reference to FIG. 5, in another embodiment of the present invention, the earset 18 can include an external microphone 70 in addition to the microphone 20 directed toward the ear canal of the user (also referred to herein as an internal microphone 20). The external microphone 70 detects air pressure changes, or sounds, originating outside the user's ear. As described below in more detail, these sounds are converted into electrical signals and compared with electrical signals corresponding to the sounds detected by the internal microphone 20. The respective signals can be processed to discern air pressure changes within the ear from externally produced noise, speech and the like.

The external microphone 70 is disposed on a exterior portion 72 of the housing 30 and is pointed away from the wearer of the earset 18 assembly. The external microphone 70 can be secured to the housing 30 with adhesive and can be disposed in a recess defined by the exterior portion 72. Similar to the internal microphone 20, the external microphone 70 is small (e.g., less than two mm in size).

The position of the external microphone 70 allows the external microphone 70 to detect air pressure changes present near the wearer's ear but having a source external to the user of the earset 18. In one embodiment, the external microphone 70 is an omnidirectional microphone.

FIG. 5 is a block diagram that illustrates a system 10' for detecting speech of the user. The system 10' includes the earset 18 having the internal microphone 20, the speaker 22 and amplifier 24a as described in greater detail above. In addition, the earset 18 of the system 10' has the external microphone 70. As one skilled in the art will appreciate, the use of the external microphone 70 is optional. The external microphone 70 is disposed on the housing 30 (FIG. 3) and generally points away from the person wearing the earset 18. As a result, the external microphone 70 detects air pressure changes located outside the ear. These air pressure changes are mainly the result of externally generated noise (other people's speech, environmental noise, etc.) and, in part, to the speech of the person wearing the earset 18, when the speech travels from the mouth of the user and through the air to the external microphone 70.

The external microphone 70 generates an electrical signal corresponding to the sounds detected by the external microphone 70. The external microphone 70 is electrically coupled to the communication device 14 using a separate and distinct input, or channel, than is used for the internal microphone 20. The signal generated by the external microphone can be amplified by an amplifier 24b and coupled to the communication device 14 with an interface adapter 26b. The communication device 14 correlates the two signals produced by the microphones 20, 70 as described below. Alternatively, the internal microphone 20 and the external microphone 70 are respectively connected to the left and right channel inputs of a processing circuit that correlates the signals as discussed below.

The unique signals generated by the internal and external microphone 20, 70 can be used to distinguish between user produced speech and externally produced sounds. In alternative configurations of the system 10', the system 10' can be adapted to cancel externally generated noise from the detections of the internal microphone 20.

When the user speaks both the internal microphone 20 and the external microphone 70 detects the speech. Sounds generated by a source other than the user (e.g., another person speaking, a passing vehicle, machinery, the hum of an air conditioner or computer, etc.) will be referred to herein as noise. Both the external microphone 70 and the internal microphone 20 detect the noise. Accordingly, the communication device 14 (or other processing circuit) can be programmed to isolate the user's speech by identifying (i.e., separating) the speech component and the noise component. As a result, a relatively noise-free speech signal can be produced which can be transmitted to the communication network 12 by the communication device 14.

In one embodiment, signal separation can be made by solving equations 1 and 2, identified below, for a sound component signal ("S") and a noise component signal ("N"). An impulse response of the internal microphone ($F_{MI}$) and an impulse response of the external microphone ($F_{ME}$) reflect the sensitivity of the microphones, the frequency response of the microphones, resonating characteristics of the ear and housing, etc. $Y_I$ represents the overall signal produced by the internal microphone and $Y_E$ represents the overall signal produced by the external microphone. Assuming that the entire system is linear (the system features are additive and homogeneous), the system can be represented by equations 1 and 2 as follows (the asterisk, or "*", represents a convolution operator):

$$F_{MI}*S+F_{MI}*N=Y_I \qquad \text{Eq. 1}$$

$$F_{ME}*S+F_{ME}*N=Y_E \qquad \text{Eq. 2}$$

By using the output signals $Y_I$ and $Y_E$ and the known impulse responses $F_{MI}$ and $F_{ME}$, the two equations can be solved in real time for the two unknown signals S and N.

Figure 6:
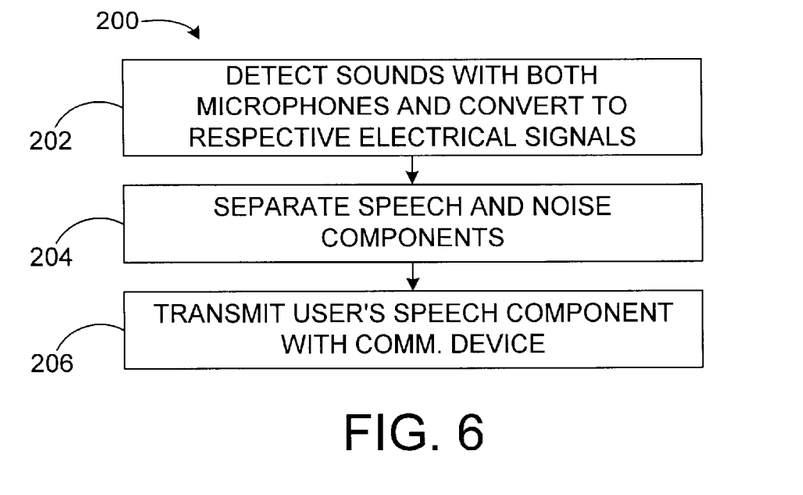
FIG. 6 is a flow chart of a method of processing signals generated by the ear microphone assembly of FIG. 5.

A method 200 for detecting speech using the system 10' is illustrated in FIG. 6. The method 200 includes the detection of changes in air pressure with both the internal microphone 20 and the external microphone 70. More specifically, in step 202, changes in air pressure within the ear 100 are detected by the internal microphone 20. These detections can be the result of the user speaking, but can also include a noise component generated external to the person wearing the earset 18 and/or a sound component generated by speech of the user and traveling from the user's mouth, through the air and to the user's ear 100 area. Also in step 202, changes in air pressure near, but outside, the ear 100 of the user are detected by the external microphone 70. These detections are mainly the result of noise generated external to the user and/or a sound component generated by speech of the user and traveling from the user's mouth, through the air and to the user's ear 100 area. The detections are converted by the microphones 20 and 70 into respective electrical signals, herein referred to as an internal signal and an external signal. The internal signal can be processed to reduce any detected feedback from the speaker 22 as discussed in more detail above.

Next, in step 204, the speech and noise components are separated as described above. The resulting speech signal from step 204 is used in step 206 to provide the signal transmitted by the communication device 14.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. An earset, comprising:
   a housing positionable with respect to an ear of a person;
   a microphone disposed with respect to the housing for insertion into the ear of a person, the microphone operable to detect a change in air pressure within the ear while the person speaks and to produce an electrical microphone signal corresponding to the internally detected change in air pressure;
   a speaker disposed with respect to the housing and operable to produce a sound corresponding to an electrical speaker signal input to the speaker; and
   a circuit coupled to receive the microphone signal produced by the microphone and the electrical speaker signal is input to the speaker, and operable to produce a corrected microphone signal having a reduced feedback component of the microphone signal, the feedback component resulting from the detection by the microphone of the sound produced by the speaker wherein the circuit includes:
      an amplifier for amplifying the microphone signal produced by the microphone;
      an amplifier for amplifying the electrical speaker signal received by the circuit and outputting an electrical feedback indication signal; and
      a combining means for combining the amplified microphone signal and the feedback indication signal to produce the corrected microphone signal.

2. The earset according to claim 1, wherein the combining means is a signal adder.

3. The earset according to claim 1, wherein the microphone is disposed for placement in a concha of the ear.

4. The earset according to claim 1, wherein the speaker is disposed for placement in a concha of the ear.

5. The earset according to claim 1, wherein the microphone is disposed for placement in an ear canal of the ear.

6. The earset according to claim 1, wherein the speaker is disposed for placement in an ear canal of the ear.

7. In combination, a communications system including the earset according to claim 1, and further comprising a communication device coupled to receive the corrected microphone signal and transmit an output corresponding to the corrected microphone signal to a remote location, and the communication device adapted to receive a signal from which the speaker signal is produced by the communication device.

8. The earset according to claim 1, further comprising a second microphone disposed with respect to the housing and located adjacent the ear and operable to detect a change in air pressure external to the ear of the person and to produce an electrical signal corresponding to the externally detected change in air pressure.

9. The earset according to claim 8, wherein a processing circuit executes logic to compare a signal strength difference between the electrical signal corresponding to the internally detected change in air pressure and the electrical signal corresponding to the externally detected change in air pressure to distinguish detections of air pressure changes produced by the person's speech from air pressure changes produced by a source external to the person.

10. A method of detecting speech of a person, comprising the steps of:
   placing a microphone at least partially within an ear of the person;
   detecting a change in air pressure within the ear of the person using the microphone, the change in air pressure corresponding to the speech of the person;
   producing an electrical microphone signal corresponding to the internally detected change in air pressure;
   placing a speaker with respect to the ear of the person;
   generating a sound with the speaker corresponding to an electrical speaker signal input to the speaker; and
   generating a corrected microphone signal by reducing a feedback component of the microphone signal, the feedback component resulting from the detection by the microphone of the sound generated by the speaker and wherein reducing the feedback includes:
      amplifying the microphone signal produced by the microphone;
      amplifying the electrical speaker signal to generate an electrical feedback indication signal; and
      combining the amplified microphone signal and the feedback indication signal to produce the corrected microphone signal.

11. The method according to claim 10, wherein the microphone is placed in a concha of the ear.

12. The method according to claim 10, wherein the speaker is placed in a concha of the ear.

13. The method according to claim 10, wherein the microphone is placed in an ear canal of the ear.

14. The method according to claim 10, wherein the speaker is placed in an ear canal of the ear.

15. The method according to claim 10, further comprising the steps of:
   coupling the corrected microphone signal to a communication device;
   transmitting an output corresponding to the corrected microphone signal by the communication device;
   receiving a signal from which the speaker signal is produced by the communication device; and
   outputting the speaker signal by the communication device.

16. The method according to claim 10, further comprising the steps of detecting an air pressure change adjacent and external to the ear of the person with a second microphone and producing an electrical signal corresponding to the externally detected change in air pressure.

17. The method according to claim 16, further comprising the step of comparing a signal strength difference between the electrical signal corresponding to the internally detected change in air pressure and the electrical signal corresponding to the externally detected change in air pressure to distinguish detections of air pressure changes produced by the speech from air pressure changes produced by a source external to the person.

* * * * *

UNITED STATES PATENT AND TRADEMARK OFFICE
CERTIFICATE OF CORRECTION

PATENT NO. : 6,671,379 B2
DATED : December 30, 2003
INVENTOR(S) : Nemirovski

It is certified that error appears in the above-identified patent and that said Letters Patent is hereby corrected as shown below:

<u>Column 1,</u>
Line 51, replace "users" with -- user's --

<u>Column 11,</u>
Line 41, replace "is" with -- as --

Signed and Sealed this

Twenty-eighth Day of September, 2004

JON W. DUDAS
*Director of the United States Patent and Trademark Office*